US011715971B1

(12) United States Patent
Hill et al.

(10) Patent No.: US 11,715,971 B1
(45) Date of Patent: Aug. 1, 2023

(54) SOLAR POWERED SMARTPHONE CASE

(71) Applicant: JW Deux Ventures, LLC, Waterford, CT (US)

(72) Inventors: Josh Hill, Waterford, CT (US); John Williams, Waterford, CT (US); Michael J. Mehrman, Sandy Springs, GA (US)

(73) Assignee: JW Deux Ventures, LLC, Waterford, CT (US)

( * ) Notice: Subject to any disclaimer, the term of this patent is extended or adjusted under 35 U.S.C. 154(b) by 0 days.

(21) Appl. No.: 17/882,656

(22) Filed: Aug. 8, 2022

(51) Int. Cl.
*H04B 1/38* (2015.01)
*H04M 1/00* (2006.01)
*H04B 7/15* (2006.01)
*H04B 7/185* (2006.01)
*H04B 7/00* (2006.01)
*H04B 1/02* (2006.01)
(Continued)

(52) U.S. Cl.
CPC ............. *H02J 7/35* (2013.01); *H02J 7/0013* (2013.01); *H02J 7/0044* (2013.01); *H02J 50/10* (2016.02); *H02S 20/30* (2014.12); *H02S 30/20* (2014.12); *H04B 1/3888* (2013.01); *H02J 2300/24* (2020.01)

(58) Field of Classification Search
None
See application file for complete search history.

(56) References Cited

U.S. PATENT DOCUMENTS 6,977,479 B2 * 12/2005 Hsu ........................... H02J 7/35
320/101
9,048,927 B2 * 6/2015 Glynn ................. H01M 10/465
(Continued)

FOREIGN PATENT DOCUMENTS

CN 10-2017-0127899 11/2017
CN 10-2018-0023457 3/2018
(Continued)

OTHER PUBLICATIONS www.indiergogo.com/projects/sunny-the-best-case-ever, Sunny—The Best Solar Case Ever, accessed Jul. 25, 2022.
(Continued)

*Primary Examiner* — Kenneth B Wells
(74) *Attorney, Agent, or Firm* — Mehrman Law Office; Michael J. Mehrman

(57) ABSTRACT

A solar powered smartphone case includes an enclosure for housing a smartphone, an internal battery, an overlying solar panel, an underlying solar panel, and a flip-out solar panel. The overlying solar panel and the flip out solar panel are carried back-to-back by a flip-out door, which articulates between a folded position and an extended position. A hinge pivotably attaches the flip-out door to the enclosure. An inductive battery charger is operative for charging the internal battery with electric power generated by the overlying solar panel, the underlying solar panel, and the flip-out solar panel. The case may also include an input port for receiving a first auxiliary power cord connecting one or more auxiliary solar panels to the inductive charger, and an output port for connecting a second auxiliary power cord connecting one or more piggy-back smartphones to be charged by the internal battery of the solar powered smartphone case.

20 Claims, 19 Drawing Sheets

(51) Int. Cl.
*H04B 1/16* (2006.01)
*H04B 1/06* (2006.01)
*H02J 7/35* (2006.01)
*H02J 50/10* (2016.01)
*H02J 7/00* (2006.01)
*H02S 30/20* (2014.01)
*H02S 20/30* (2014.01)
*H04B 1/3888* (2015.01)

(56) References Cited

U.S. PATENT DOCUMENTS

| | | | |
|---|---|---|---|
| 9,680,518 | B2 | 6/2017 | Wojcik et al. |
| 9,698,623 | B2 | 7/2017 | Adams et al. |
| 9,774,192 | B2 | 9/2017 | Wojcik et al. |
| 10,008,870 | B2 | 6/2018 | Davison et al. |
| 10,044,229 | B2 | 8/2018 | Partovi et al. |
| 10,219,598 | B2 | 3/2019 | Gronewoller et al. |
| 10,326,298 | B2 | 6/2019 | Lee et al. |
| 10,452,105 | B2 | 10/2019 | Zenoff |
| 10,461,581 | B2 | 10/2019 | Klawon et al. |
| 10,548,380 | B2 | 2/2020 | Rayner et al. |
| 10,840,727 | B1* | 11/2020 | Subero ............ H02J 50/80 |
| 11,290,052 | B2* | 3/2022 | Williams .......... H02S 30/00 |
| 2008/0143291 | A1* | 6/2008 | Lin .................. H02J 7/35 320/101 |
| 2008/0268916 | A1 | 10/2008 | Lin et al. |
| 2009/0160396 | A1* | 6/2009 | Shyu ............... H04M 19/08 320/101 |
| 2010/0317413 | A1* | 12/2010 | Tan ................. H02J 7/35 455/573 |
| 2011/0065474 | A1 | 3/2011 | Won et al. |
| 2016/0285495 | A1 | 9/2016 | Vick et al. |
| 2016/0028272 | A1 | 10/2016 | Dukes |

FOREIGN PATENT DOCUMENTS

| | | |
|---|---|---|
| KR | 20160123198 A | 10/2016 |
| KR | 20170127899 A | 11/2017 |
| KR | 201800234 A | 5/2018 |
| KR | 101786327 B1 | 6/2019 |
| TW | M534543 U | 1/2017 |
| WO | WO2019071417 A1 | 4/2019 |

OTHER PUBLICATIONS www.amazon.com/Snowlizard-Snowlizard-SLXtreme-Powered-Waterproof-Battery-dp/BO6xkDSP5b, Snowlizard SLXtreme iPhone Case, accessed Jul. 25, 2022.
www.amazon.com/Charger-25000mAh-Riapow-Outdoor-Waterproof/dp/B07VPFNRHK, Solar Charger 25000mAh Power Bank—Riapow Portable Phone Charger External Battery Pack with 4 Solar Panels Dual USB Output Ports for Phone Samsung, accessed Jul. 25, 2022.
PCT/US/2022-039666, International Preliminary Search Report and Written Opinion, dated Mar. 30, 2023.

* cited by examiner

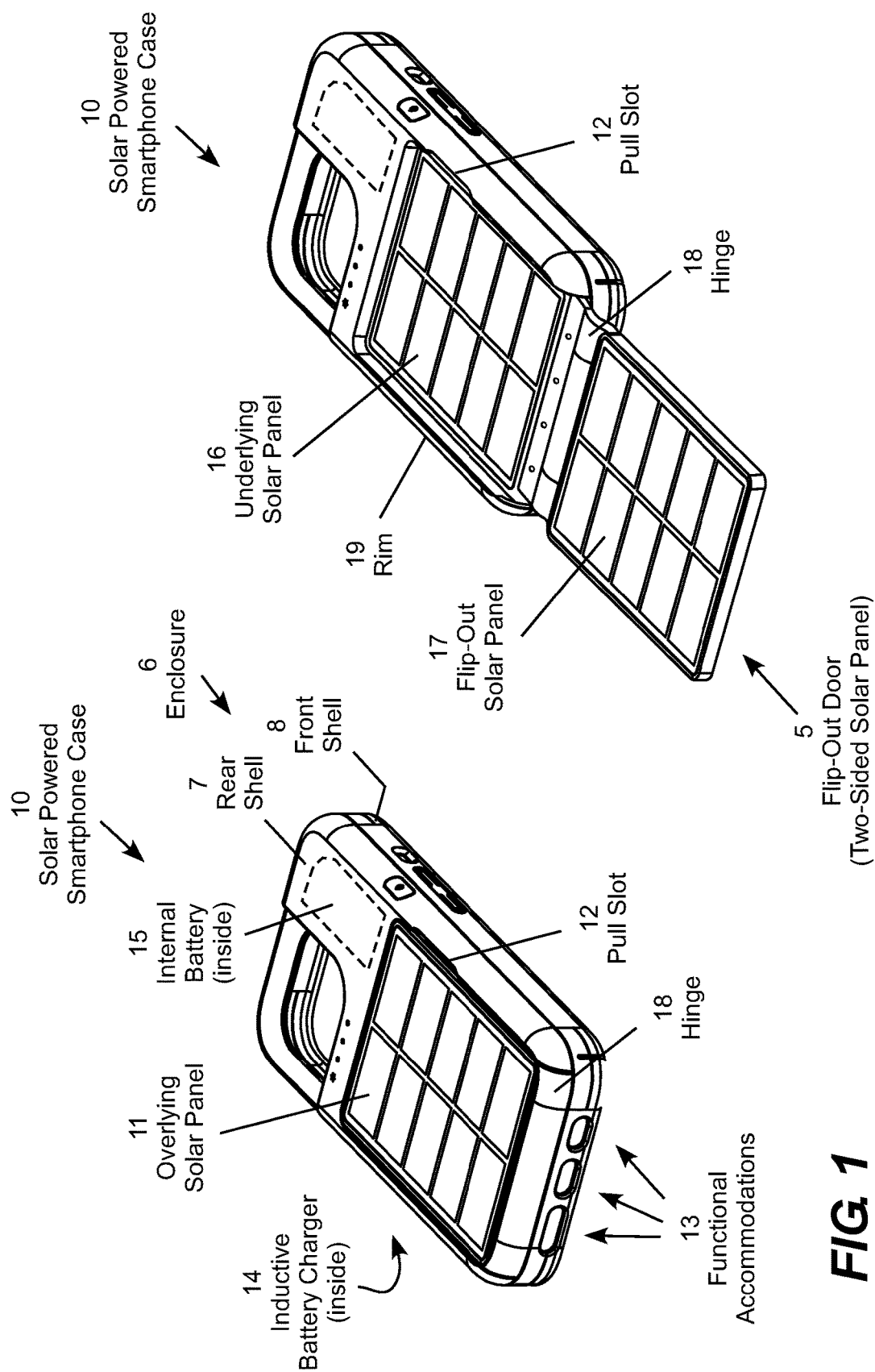

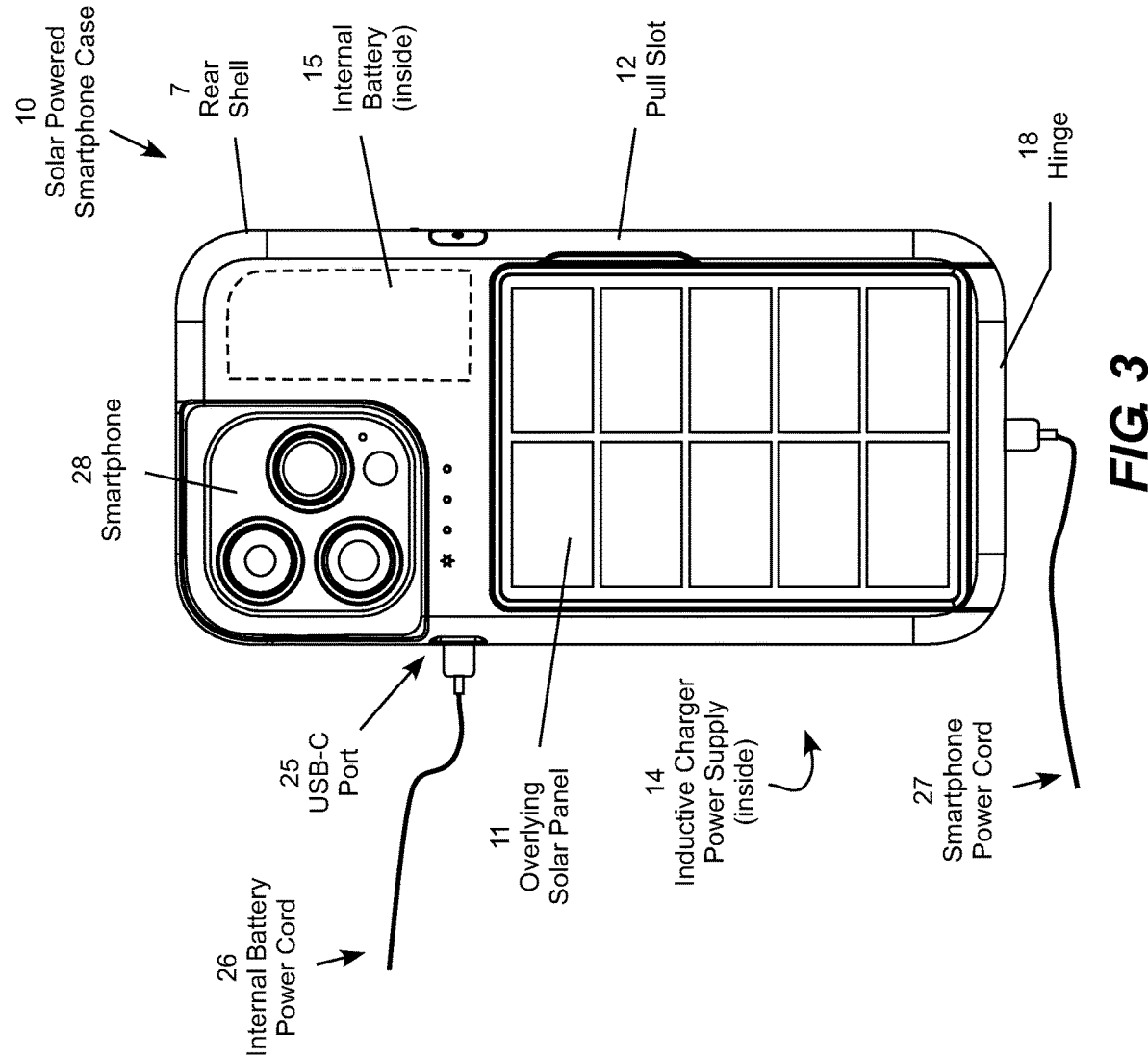

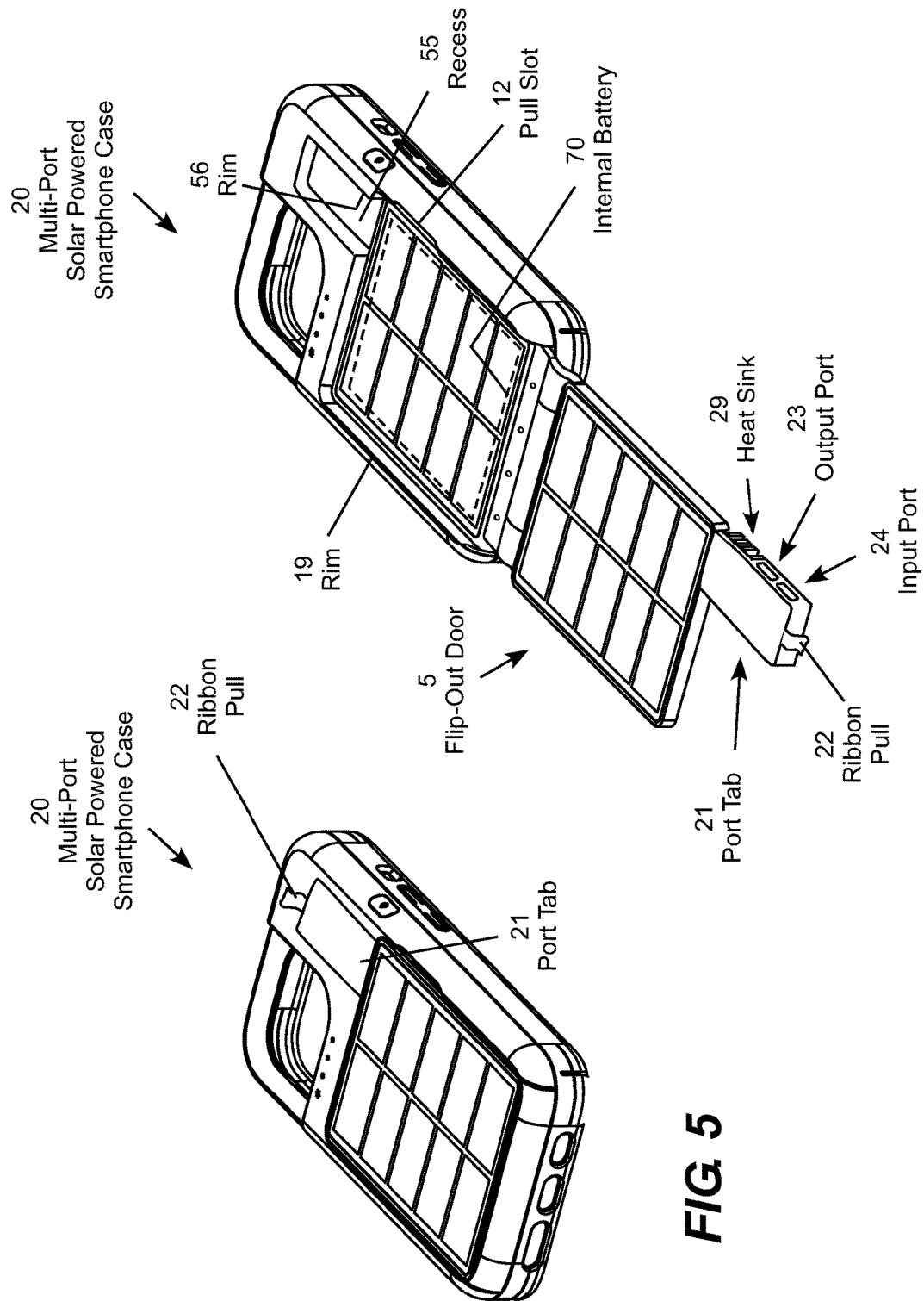

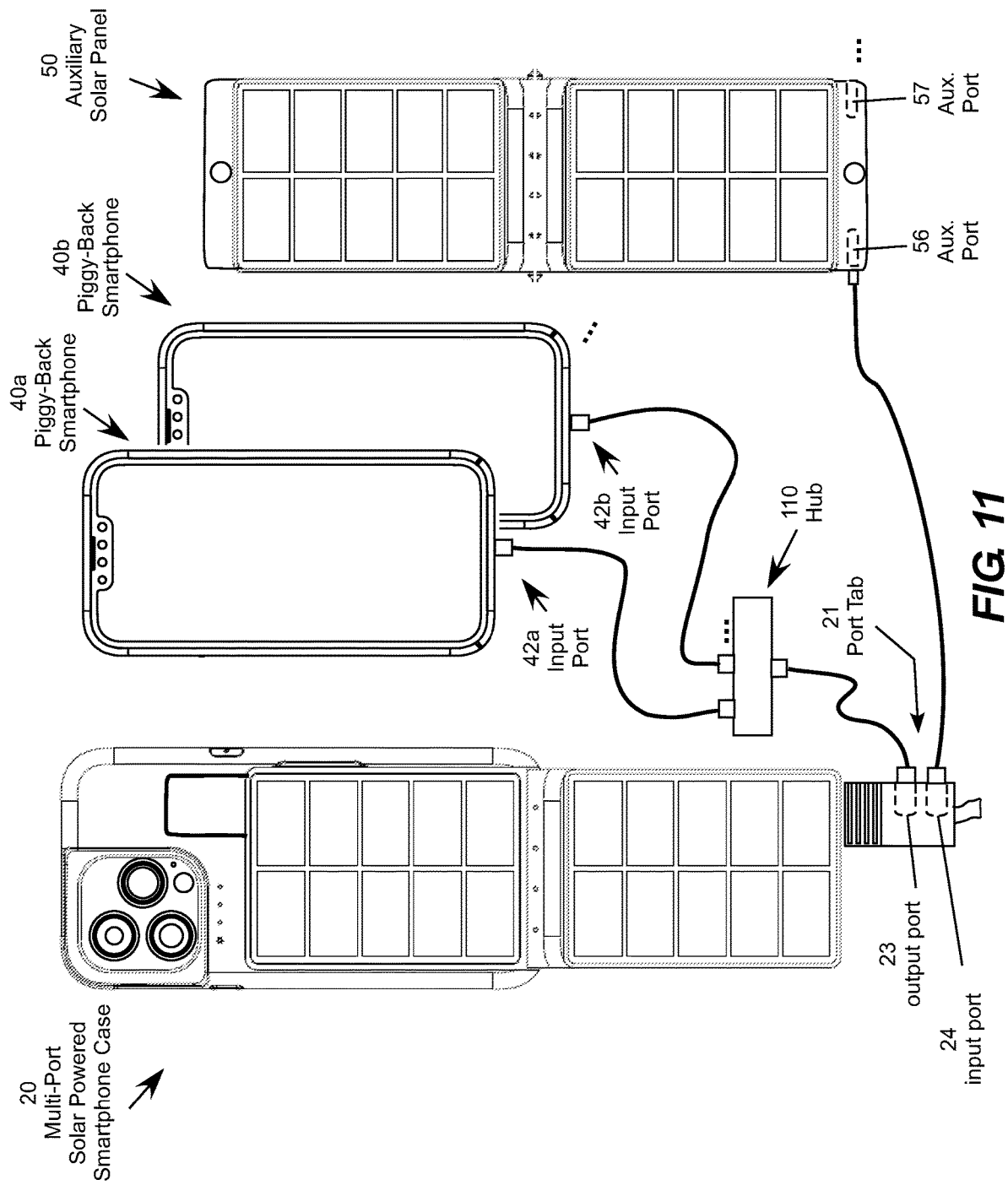

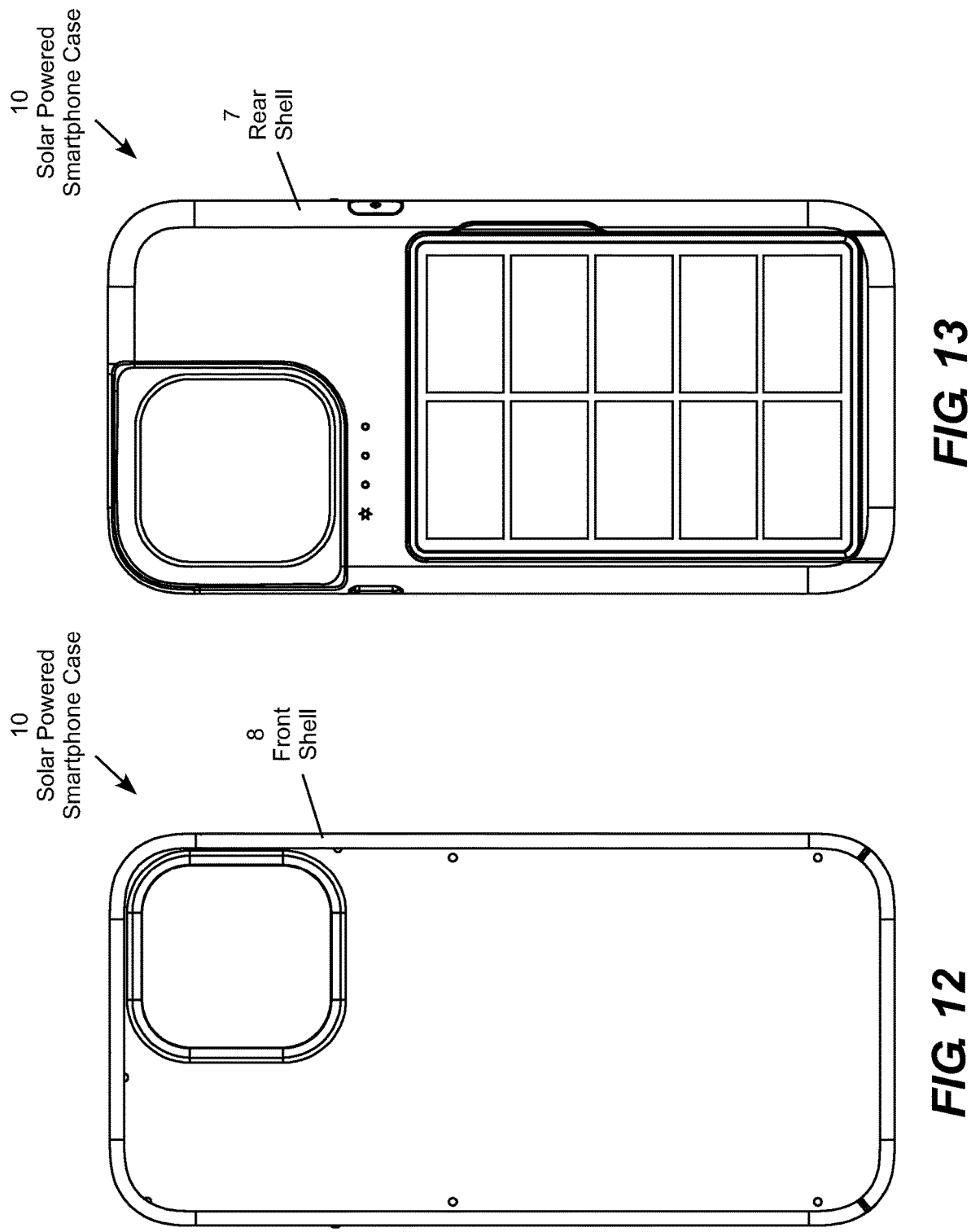

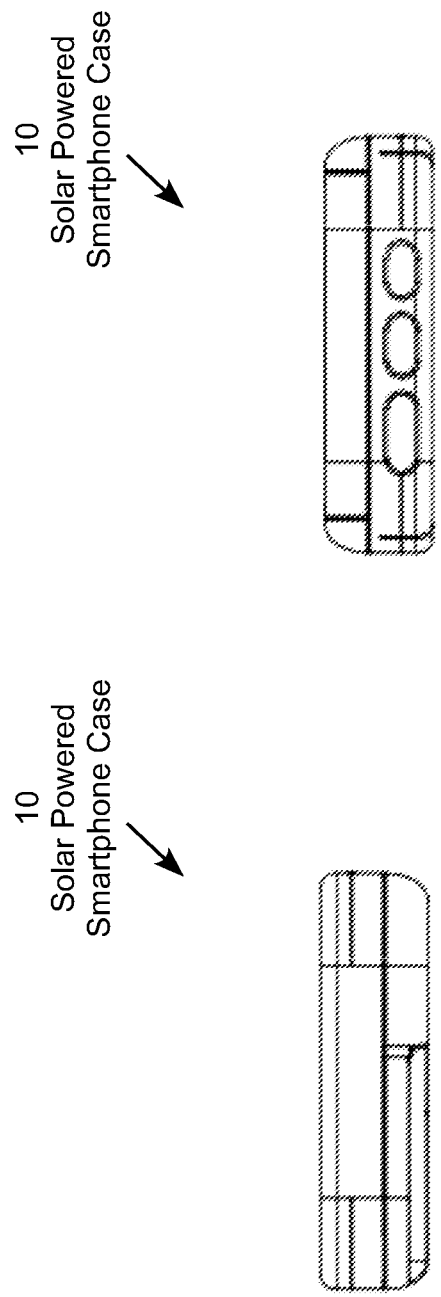

SOLAR POWERED SMARTPHONE CASE

TECHNICAL FIELD

The present invention is directed to smartphones and, more particularly, to a solar powered smartphone case with three solar panels, including a flip-out solar panel, that charge a smartphone battery, an internal battery, and may include an input port for connecting one or more auxiliary solar panels, and an output port for charging the batteries in one or more piggy-back smartphones.

BACKGROUND

Solar powered smartphone cases, external batteries, and solar powered external battery chargers have been commercially available for some years. Conventional solar powered battery chargers built into smartphone cases are limited to the physical size of the smartphone, limited to the onboard solar panel, and extremely expensive. Although external batteries and solar powered external battery chargers are commercially available, they have limited operational flexibility and are generally not configured to directly charge the battery inside a smartphone. In addition, conventional solar powered smartphone cases are generally not configured to integrate multiple solar panels, or batteries inside multiple smartphones. There is, therefore, a continuing need for more functional, effective and less costly solar powered smartphone cases and related accessories.

SUMMARY

The present invention meets the need described above through a solar powered smartphone case including an enclosure for housing a smartphone, an underlying solar panel, an overlying solar panel, a flip-out solar panel, and an internal battery. The overlying solar panel and the flip out solar panel are carried back-to-back by a flip-out door, which articulates between a folded (closed) position and an extended (open) position. A hinge pivotably attaches the flip-out door to the enclosure. An inductive battery charger is operative for charging a smartphone battery and may also charge the internal battery with electric power generated by the solar panels. In a representative embodiment, the overlying solar panel is exposed, and the underlying solar panel is concealed, when the flip-out door is in the folded position. In addition, the underlying solar panel and the flip-out solar panel are both exposed when the flip-out door is in the extended position, providing twice the solar charging capacity. The enclosure is configured to house the smartphone with the battery in the smartphone positioned to be charged by the inductive charger. As an option, the solar panels may simultaneously charge the internal case battery. The enclosure may also include a rim creating a snug interference fit releasably holding the flip-out door in the folded position. The rim may define one or more pull slots providing access to manually articulate the flip-out door from the folded position to the extended position.

An alternative embodiment includes an input port for receiving a first auxiliary power cord connecting one or more auxiliary solar panels to the inductive charger inside the case. This embodiment may also include an input current clamp limiting electric current provided by the auxiliary solar panels to the inductive charger. The solar powered smartphone case may alternatively or additionally include an output port for connecting a second auxiliary power cord connecting one or more piggy-back smartphones to be charged by the solar panels and/or the internal battery of the solar powered smartphone case. This embodiment may also include an output current clamp limiting electric current provided to the piggy-back smartphones.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which:

FIG. 1 is a perspective rear view of a solar powered smartphone case.

FIG. 2 is a perspective rear view of the solar powered smartphone case with its flip-out solar panel extended.

FIG. 3 is a rear view of the solar powered smartphone case.

FIG. 5 is a perspective rear view of a multi-port solar powered smartphone case.

FIG. 6 is a perspective rear view of the multi-port solar powered smartphone case with its flip-out solar panel extended.

FIG. 11 is a rear view of the multi-port solar powered smartphone case connected to a piggy-back smartphone and an auxiliary solar panel.

FIG. 12 is a front view of the solar powered smartphone case not enclosing smartphone.

FIG. 13 is a rear view of the solar powered smartphone case not enclosing smartphone.

FIG. 18 is a top side view of the solar powered smartphone case.

FIG. 19 is a bottom side view of the solar powered smartphone case.

DESCRIPTION OF ILLUSTRATIVE EMBODIMENTS

Figure 4:
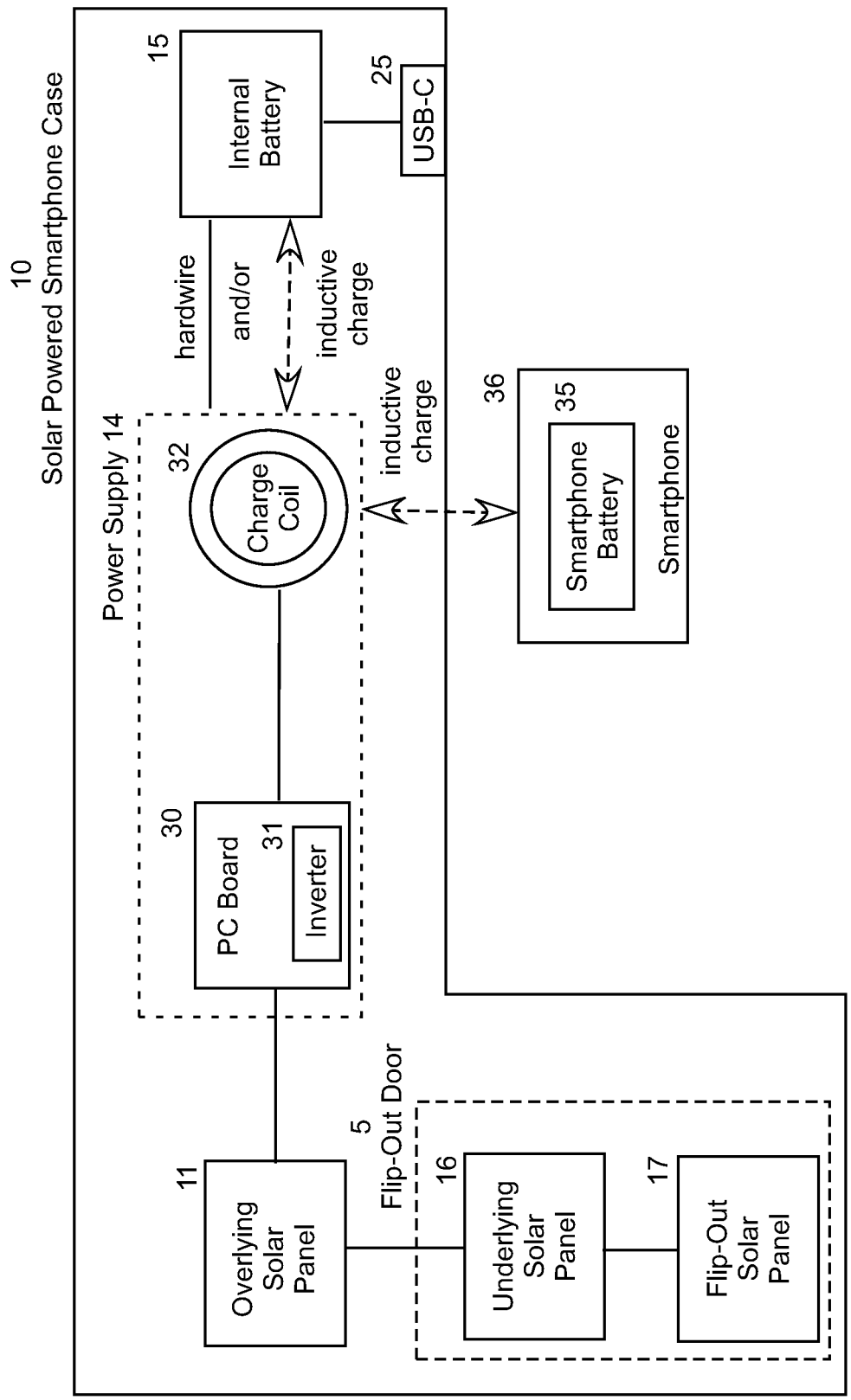
FIG. 4 is a functional block diagram of the solar powered smartphone case.

Embodiments of the present invention include a solar powered smartphone case with an internal battery and three solar panels, including an overlying solar panel, an underlying solar panel, and a flip-out solar panel, that charge the battery in a smartphone carried by the case. As an option, the solar panels may simultaneously charge the internal case battery. The overlying solar panel and the flip-out solar panel are carried back-to-back on a flip-out door. With the door in the folded (closed) position, the overlying solar panel is exposed to provide one solar panel as a first level of solar charging capacity having somewhat smaller dimensions than the smartphone. With the flip-out panel extended, an underlying solar panel and the flip-out solar panel are exposed to provide two solar panels with twice the solar charging capacity. In an alternative embodiment, a multi-port solar powered smartphone case includes a larger internal battery, an input port for connecting one or more auxiliary solar panels, and an output port for simultaneously charging the battery in one or more piggy-back smartphone. Each of these features improves significantly over conventional solar powered smartphones cases and external battery chargers.

Reference will now be made in detail to embodiments of the invention. In general, the same or similar reference numerals are used in the drawings and the description to refer to the same or like parts or steps. The drawings are in simplified form and are not to precise scale unless specifically indicated. The word "couple" and similar terms do not necessarily denote direct and immediate connections, but also include connections through intermediate elements or devices. Certain descriptors, such "first" and "second", "top and bottom", "upper" and "lower", "inner" and "outer" or similar relative terms may be employed to differentiate structures from each other. These descriptors are utilized as a matter of descriptive convenience and are not employed to implicitly limit the invention to any particular position or orientation.

FIG. 1 is a perspective rear view of a solar powered smartphone case 10 in a folded (closed) position, FIG. 2 shows the case in an extended (open) position, and FIG. 3 is a rear view of case holding a smartphone 28 in the closed position providing an additional point of view. The solar powered smartphone case 10 also includes a pull slot 12 allowing the user to place a finger or other object against a portion of a side of the flip-out door 5 to pivot (flip out) the door carrying the overlying solar panel 11 and the flip-out solar panel 17 into the extended position (open) shown in FIG. 2. A second pull slot may be included on the opposing side of the rim to allow the user to pinch grasp the flip-out door 5. Additional or different pull slots, ribs, clasps, ribbons, spring catches or other features for grasping or articulating the flip-out door 5 may be included as a matter of design choice. The solar powered smartphone case 10 also includes functional accommodations 13 configured for utilizing the features of a particular type of smartphone, in this particular example an iPhone 13 Pro model. For example, the functional accommodations include button covers, holes for the microphone and speaker, an opening for a battery charger plug, and other accommodations for the specific model of smartphone the case is designed to carry. The present invention is indifferent to the specific functional accommodations designed for a particular model smartphone, which will not be described further.

In this embodiment, the solar powered smartphone case 10 includes a flip-out door 5 along with an enclosure 6 formed by a rear shell 7 and a front shell 8 for housing the smartphone 28. The case 10 includes an overlying solar panel 11 exposed when the flip-out door 5 is in its folded (closed) position. When exposed, the overlying solar panel 11 charges the smartphone battery inside the smartphone 28 carried within the smartphone case 10. FIG. 2 shows the smartphone case 10 with the flip-out door 5 in its extended (open) position exposing the underlying solar panel 16 and the flip-out solar panel 17, which are carried back-to-back on the flip-out door 5 forming a two-sided solar panel that articulates on a hinge 18. The hinge 18 may be elastomeric, fabric, barrel, piano, spring-loaded butt, or any other suitable type of hinge for this application. The folded (closed) position shown in FIG. 1 conceals the underlying solar panel 16 and the flip-out solar panel 17, while exposing the overlying solar panel 11 providing a first level of solar charging capacity (i.e., single solar panel charging). In the folded (closed) position shown in FIG. 1, only the overlying solar panel 11 charges the battery inside the smartphone carried within the smartphone case. As an option, the solar panels 11, 16 and 17 may simultaneously charge the internal case battery 15.

The user can flip the door 5 to the extended (open) position shown in FIG. 2 to expose the underlying solar panel 16 and the flip-out solar panel 17 providing a second level of solar charging capacity (i.e., double solar panel charging). As shown in FIG. 2, the rear shell 7 of the enclosure 6 formed by smartphone case 10 includes a rim 19 providing a snug interference fit for holding the flip-out door 5 in place in the folded (closed) position shown in FIG. 1. The rim 19 preferably forms a watertight seal with the door 5 in the folded (closed) position. In the extended (open) position shown in FIG. 2, both the underlying solar panel 16 and the flip-out solar pane 17 charge the battery inside the smartphone carried within the smartphone case and may simultaneously charge the internal case battery 15. In this embodiment, the hinge 18 connects the flip-out door 5 to the front shell 8 of the case and houses wiring electrically connecting the flip-out solar panel 17 with the rest of the case 10.

FIG. 4 is a functional block diagram of the solar powered smartphone case 10 schematically indicating the overlying solar panel 11, the power supply 14, the internal battery 15, the flip-out door 5, the underlying solar panel 16 and the flip-out solar panel 17. The power supply 14 includes a PC board (PCB) 30 carrying a microprocessor, supporting electronics, and an inverter 31 coupled to a charge coil 32 positioned to inductively charge the battery 35 inside the smartphone 36 enclosed within the smartphone case 10. The smartphone battery 35 overlies the charge coil 32, which is positioned against the housing of the smartphone 36 directly over the battery 35 when the smartphone is enclosed within the case 10, which positions the smartphone well for inductive charging by the charge coil 32. As an option, the charge coil 32 may also partially overly the internal battery 15. Alternatively or additionally, the internal battery 15 may be hardwired to the power supply 14 allowing the internal battery to be charged by the solar panels and/or a smartphone carried inside the case without utilizing inductive charging, which allows the internal battery to be indirectly charged by a power cord charging the smartphone with or without inductive charging of the internal case battery. Although the operating frequency of the inverter 31 is a matter of design choice and generally in the range of hundreds of Hz to hundreds of kHz, 100-300 kHz is a typical operating frequency range presently considered suitable in view of the proximity of the charge coil 32 to the internal battery 15 in this embodiment.

FIG. 3 is a rear view of the case 10 holding a smartphone 28 in the closed position. The case 10 includes a USB port 25 for charging the internal battery 15 through an internal battery power cord 26 connected to a 120 V electric power outlet. The case 10 also includes a functional accommodation allowing the smartphone power cord 27 to be plugged into the smartphone 28 for charging by a 120 V power source. As an option, the charge coil 32 may partially overly the internal battery 15 so that the smartphone battery 35 and the internal battery 15 are simultaneous charged by the charge coil 32. Because the internal battery 15 and the smartphone battery 35 inside the smartphone 36 are both electrically connected to the charge coil 32 by way of the inverter 31 carried on the PCB 30, the internal battery 15 is capable of charging the smartphone battery 35 when the case 10 is not receiving power from the solar panels or a power cord. Similarly, the case 10 allows the smartphone battery 35 to inductively (or hardwire) charge the internal battery 15 when the smartphone battery is charged by the power cord 27 connected to the smartphone, so that both batteries become fully charged when the case 10 or the smartphone 35 receive electric power from the solar panels 11, 16 or 17, or when either battery 15 or 35 is charged by a power cord 26 or 27, respectively. Providing the case 10 and the smartphone 36 with ports for separate power cords allows both batteries to be charged faster when they are both connected to 120 V charging power through the power cords.

Figure 7:
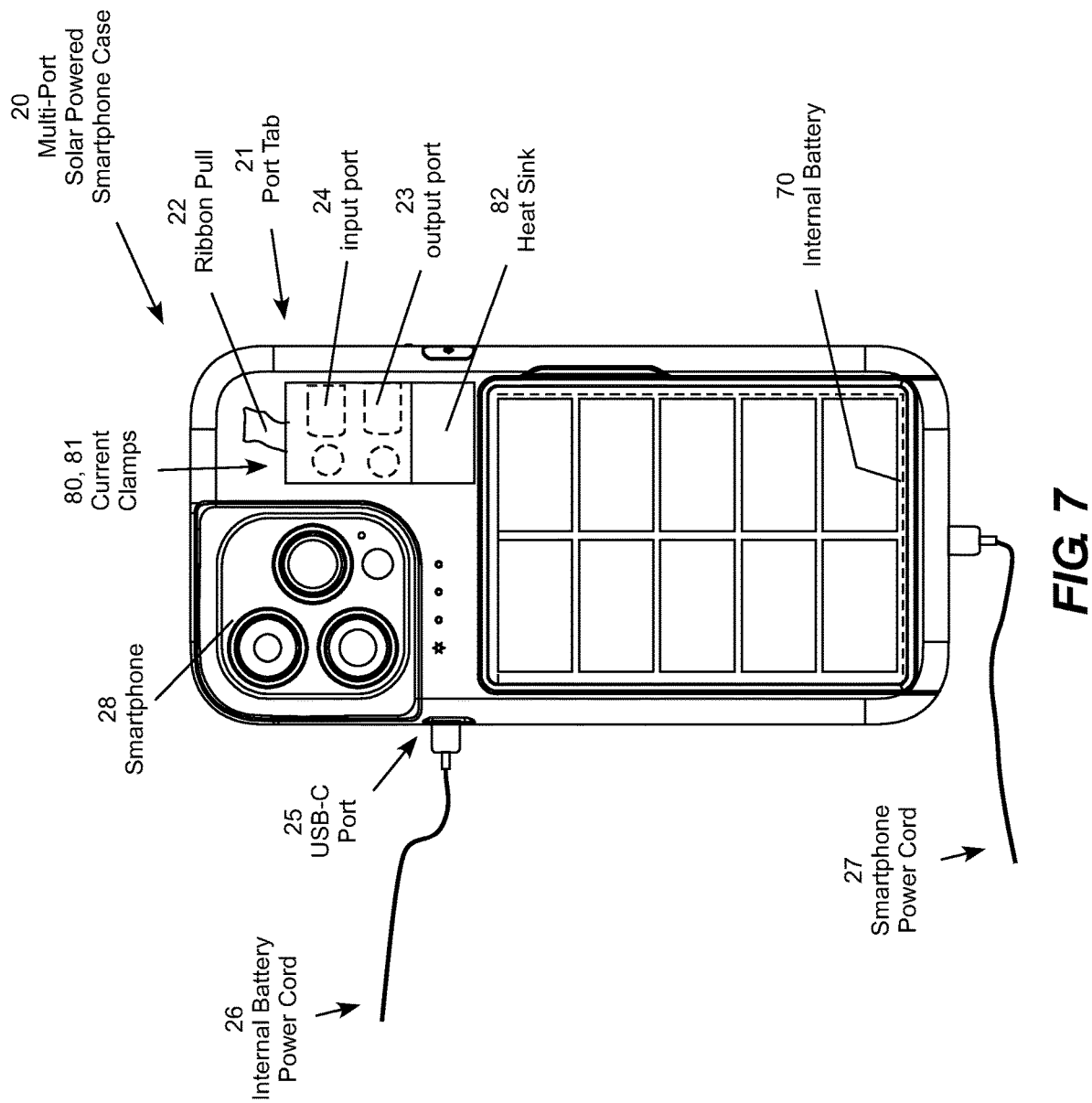
FIG. 7 is a perspective rear view of a multi-port solar powered smartphone case.
Figure 8:
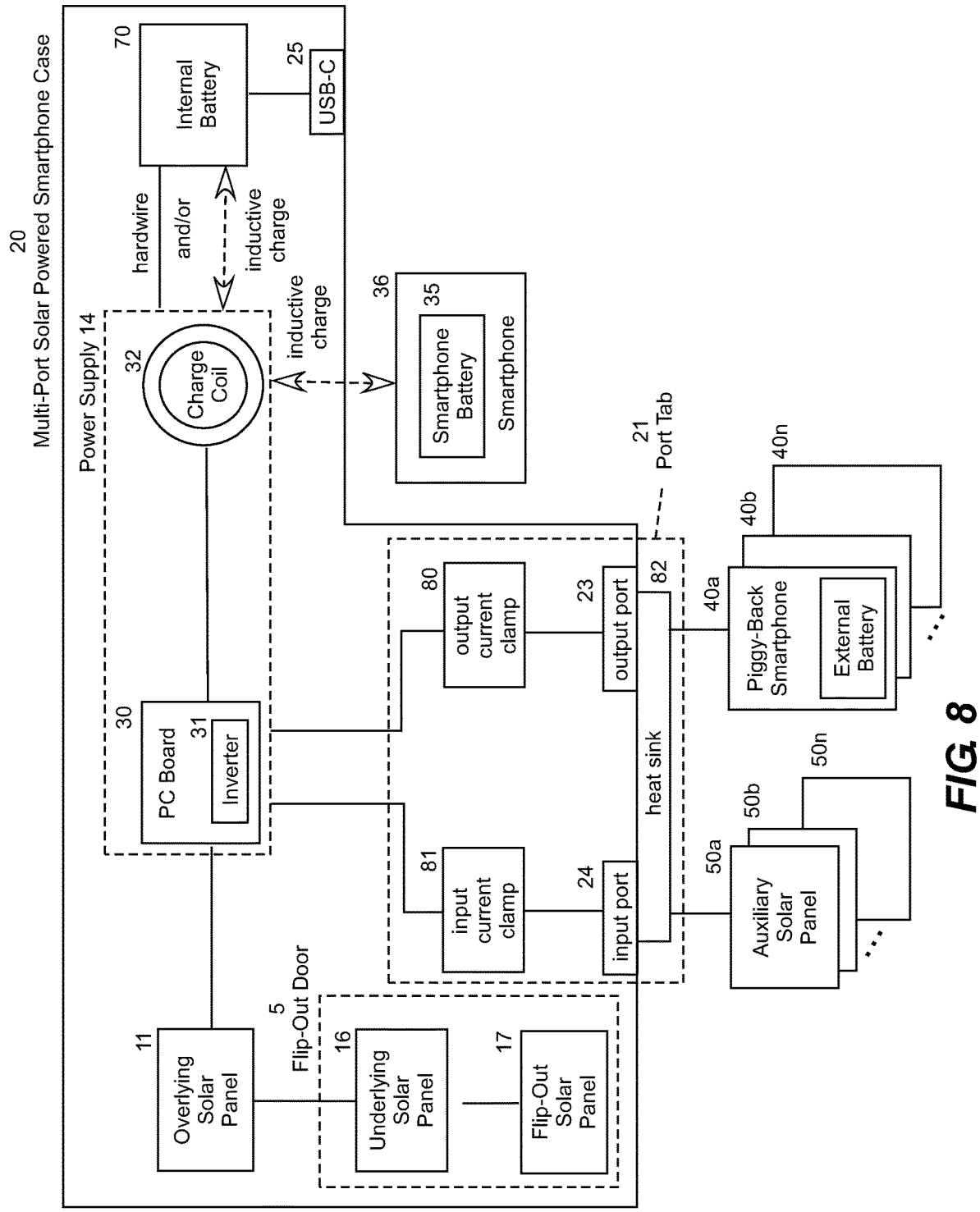
FIG. 8 is a functional block diagram of the multi-port solar powered smartphone case.

FIG. 5 is a perspective rear view of a multi-port solar powered smartphone case 20 in a folded (closed) position, FIG. 6 shows the multi-port case in an extended (open) position, FIG. 7 is a rear view of multi-port case in the closed position, and FIG. 8 is a functional block diagram of the multi-port solar powered smartphone case. The multi-port case 20 is similar to the case 10 described above with reference to FIGS. 1-4, except that multi-port case includes a larger internal battery 70, a port tab 21 and a ribbon pull 22 extending from the port tab. The port tab 21, which extends from the flip-out door 5, includes one or more auxiliary ports for connecting the multi-port solar powered smartphone case 20 to other devices for charging, or being charged by, those devices. In the particular example shown FIG. 5, the port tab 21 includes an output port 23 for connecting one or more piggy-back phones and/or external batteries 40a-40n to simultaneously charge the batteries in these devices from the internal battery 70 of the multi-port case 20. Although the electric hardwire connection from the output port 23 is routed through the power supply 14 to the internal battery 15 in the embodiment shown in FIG. 8, that hardwire connection may be routed directly from the output port 23 to the internal battery 70 a matter of design choice.

The port tab 21 also includes an input port 24 for connecting one or more auxiliary solar panels 50a-50n to power the charge coil 32. Since the auxiliary solar panels 50a-50n energize the charge coil 32, they simultaneously charge the smartphone battery 3, when present, and the internal case battery 70. The internal case battery, in turn, charges any other batteries connected to the multi-port case 20 through the input port 23. The rim 19 is extended to create a recess 55 surrounded on three sides by a rim 56 forming a snug interference fit with the port tab 21. The rim 56 preferably forms a watertight seal with the port tab 21 when the flip-out door 5 is in the folded (closed) position to prevent water from infiltrating the output and input ports 23, 24. The ribbon pull 22 provides a mechanism for manually flipping out the door 5 that may be more convenient, for example, for people with impaired finger dexterity, long fingernails, or some other condition or situation making it difficult to open the device using the pull slot 12. The user may extend the ribbon pull 22 out from the pull tab 21 or conceal in under the pull tab 21 when the door 5 is closed, as may be desired by the user.

Although the output port 23 and the input port 24 are disposed on the port tab 21 attached to the flip-out door 5 in this particular embodiment, the output and/or input ports may be located in other positions on the case 20 as a matter of design choice. For example, the port tab 21 may be replaced by a door opening to provide access to one or more input and/or output ports located on a fixed portion of the case 20. It will nevertheless be appreciated that port tab 21 attached to the flip-out door 5 is an advantageous place to locate the input and output ports 23, 24, where they can be located adjacent to the current clamps 80, 81 and the associates heat sink 82 to keep the power electronics cool and maximize the current carrying capacity of the ports. In addition, the rim 50 around the port tab 21 provides a watertight seal protecting the ports when the flip-out door 5 is in the folded position. The location of the port tab 21 also provides a convenient place to attach power cords to the input and output ports while keeping the cords clear of the solar panels and the other electronic away from the power electronics and the heat sink to avoid overheating the other electronic components, such as the microprocessor and the inverter. A different number of input and/or output ports, which be disposed in more than one location on the multi-port case 20, may be provided as a matter of design choice.

The external batteries 40a-40n and the auxiliary solar panels 50a-50n are electrically connected in parallel to receive the same voltage from the output port 23 and the input port 24, respectively. As shown in FIG. 8, the multi-port case 20 includes an output current clamp 80 and an input current clamp 81 to limit the electric current to the output port 23 and the input port 24, respectively, to safe levels. For example, the current clamps 80 and 81 may be silicon carbide (SiC) current limiting devices (CLDs) (also known as current limiters). This allows multiple devices to be connected to maximize the charging capacity while protecting the multi-port case 20 from over-current damage. For example, the hardwire connections of the multi-port case 20 may be selected to support current in the range of 5 to 10 Amps DC, and the output and input current clamps 80 and 81 may be selected to limit the output and input current to the same levels. This particular maximum current range is merely illustrative and may be altered as a matter of design choice. In addition, the maximum input current need not be the same as the maximum output current level. Although the output current clamp 80 and an input current clamp 81 are shown to be separate from the power supply 14 in the embodiment shown in FIG. 8, they may be integrated into the power supply 14, and for example located on the PC board 30, as a matter of design choice. The current clamps 80, 81 may also be aided by a heat sink 82, such as cooling wands, grids or fins, which may be disposed internally or externally on a side, edge or perimeter of the case 10 to dissipate heat increasing the current carrying capacity of the case wiring and electronics. This particular example includes an metallic heat sink 82 attached to the port tab 21 with fins disposed between the output and inputs ports 23, 24 and the end of the flip-out door 5. The current clamps 80 and 81 may also located on the port tab adjacent to the output and inputs ports 23, 24 and near the heat sink 82 to facilitate cooling of the current clamps. Electric wiring runs from the output and inputs ports 23, 24, through current clamps 80 and 81, across the heat sink 82, through the flip-out door 5, and through the hinge 18 to the internal battery 70 and the PCB 30. In an embodiment with external piggy-back batteries or smartphones and external auxiliary solar panels, as represented by FIG. 11 (which may include external piggy-back batteries and/or more external piggy-back smartphones and/or more external auxiliary solar panels than shown in this particular illustrative embodiment), a portion, most or even all of the electricity generated by the external auxiliary solar panels may be directed to the external piggy-back batteries and or external piggy-back smartphones without traveling through the wiring of the smartphone case other than the port tab, which may include additional electronics and physical components as appropriate for the system configuration in accordance with customary electronic design within the ordinary skill of those skilled in the technology.

Figure 9:
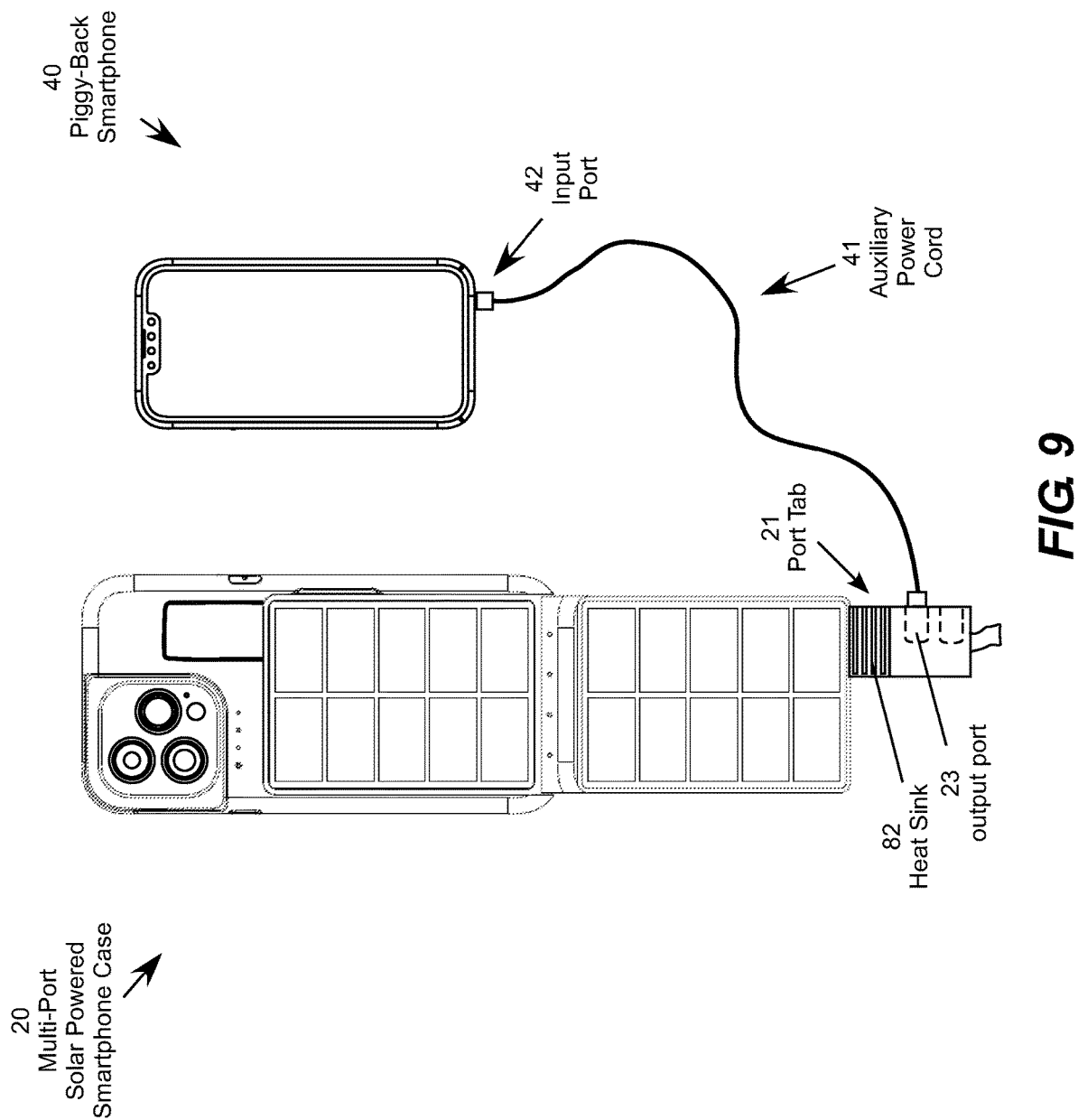
FIG. 9 is a rear view of the multi-port solar powered smartphone case connected to a piggy-back smartphone.

To illustrate one example connection configuration, FIG. 9 is a rear view of the multi-port solar powered smartphone case 20 connected to a piggy-back smartphone 40. An auxiliary power cord 41 connects the output port 23 of the multi-port case 20 to a battery-charging input port 42 of the piggy-back smartphone 40. Additional piggyback smartphones may be connected in parallel to the output port 23 using 2-to-1 splice connectors or power cords. Ultimately, the output current clamp 80 of the multiport case 20 limits the total output current from the connected auxiliary panels to the maximum designed current, for example in the range of 5 to 10 Amps DC.

Figure 10:
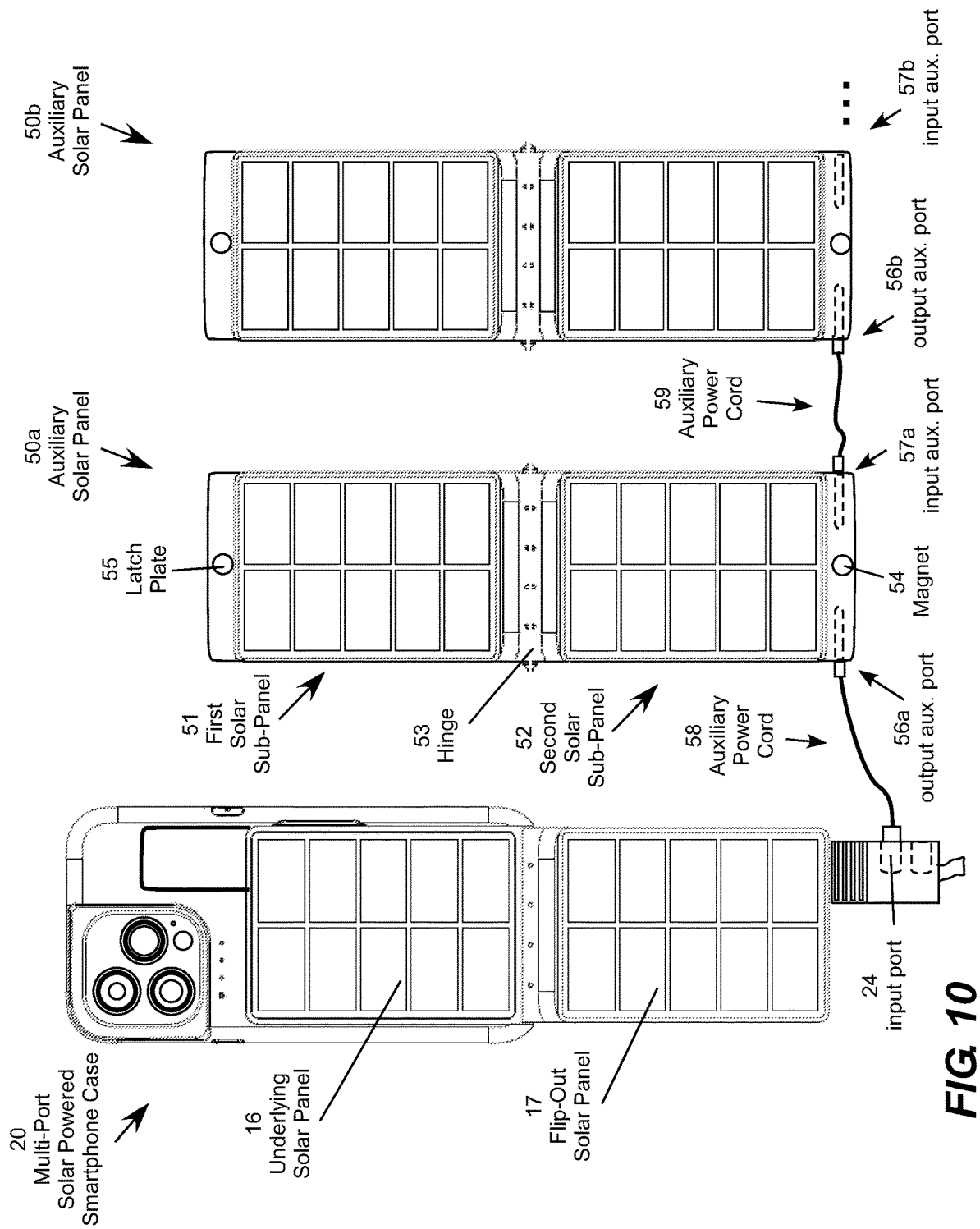
FIG. 10 is a rear view of the multi-port solar powered smartphone case connected to a pair of auxiliary solar panels.

To illustrate another example connection configuration, FIG. 10 is a rear view of the multi-port solar powered smartphone case 20 connected to a pair of auxiliary solar panels 50a and 50b. Referring to the auxiliary solar panel 50a as representative, this auxiliary panel includes first and second solar sub-panels 51 and 52 connected by a hinge 53 allowing the device to be folded when not in use with the solar panels held face-to-face for protection. The hinge 53 may be elastomeric, fabric, barrel, piano, spring-loaded butt, or any other suitable type of hinge for this application. In this particular embodiment, the auxiliary solar panel 50a also includes a permanent magnet 54 and a metallic latch plate 55 to releasably hold the panels in the folded (closed) configuration when not in use. As an alternative to the magnetic latch, the auxiliary solar panels may include a frame around one of the solar panels defining a rim with one or more pull slots, similar to the rim 19 on the solar powered smartphone case 10, forming a snug interference fit with the other solar panel releasably holding the solar panels face-to-face in the folded position. Additional or different pull slots, ribs, clasps, ribbons, spring clasps, or other features for opening and closing the folding solar panels may be included as a matter of design choice.

In addition, the auxiliary solar panel 50a includes an output auxiliary port 56a for connecting the auxiliary solar panel to the multiport case 20 and an input auxiliary port 57a for connecting another auxiliary solar panel in parallel allowing multiple auxiliary solar panels to be jumped together for connection the to the multiport case 20. In the particular connection example shown in FIG. 10, a first auxiliary power cord 58 connects the input port 24 of the multi-port case 20 to the output auxiliary port 56a of the first auxiliary solar panel 50a. Similarly, in this embodiment, a second auxiliary power cord 59 connects the auxiliary input port 57a of the first auxiliary solar panel 50a to the auxiliary output port 56b of the second auxiliary solar panel 50b. Additional auxiliary solar panels may be connected in parallel to the input port 24 the multiport case 20 in the same manner. Ultimately, the input current clamp 81 of the multiport case 20 limits the total input current provided by the connected auxiliary panels to the maximum designed current, for example in the range of 5 to 10 Amps DC.

To illustrate another example connection configuration, FIG. 11 is a rear view of the multi-port solar powered smartphone case 20 with its output port 23 connected to the input ports 42a, 42b of piggy-backed smartphones 40a, 40b by way of a hub 110. Other devices to be charged, such as, for example, a laptop computer, tablet, external battery, video camera, radio, GPS device, emergency beacon, flashlight, and the like may be charged in this manner. In addition, the input port 24 is connected to the auxiliary port 56 of an auxiliary solar panel 50, which also has a second auxiliary port 57 for daisy-chaining additional charging devices, such as auxiliary solar panels, external batteries, and the like to the smartphone case 20. It will be appreciated that these specific configurations are merely illustrative, multiple devices to be charged may be connected by daisy chain to the output port 24, multiple charging devices may be connected via a hub to the input port 23, and many other connection configurations may be accommodated within the operational parameters of the multi-port case 20 as facilitated by the output clamps 80, 81 and the heat sink 82 carried on the port tab 21.

Figure 15:
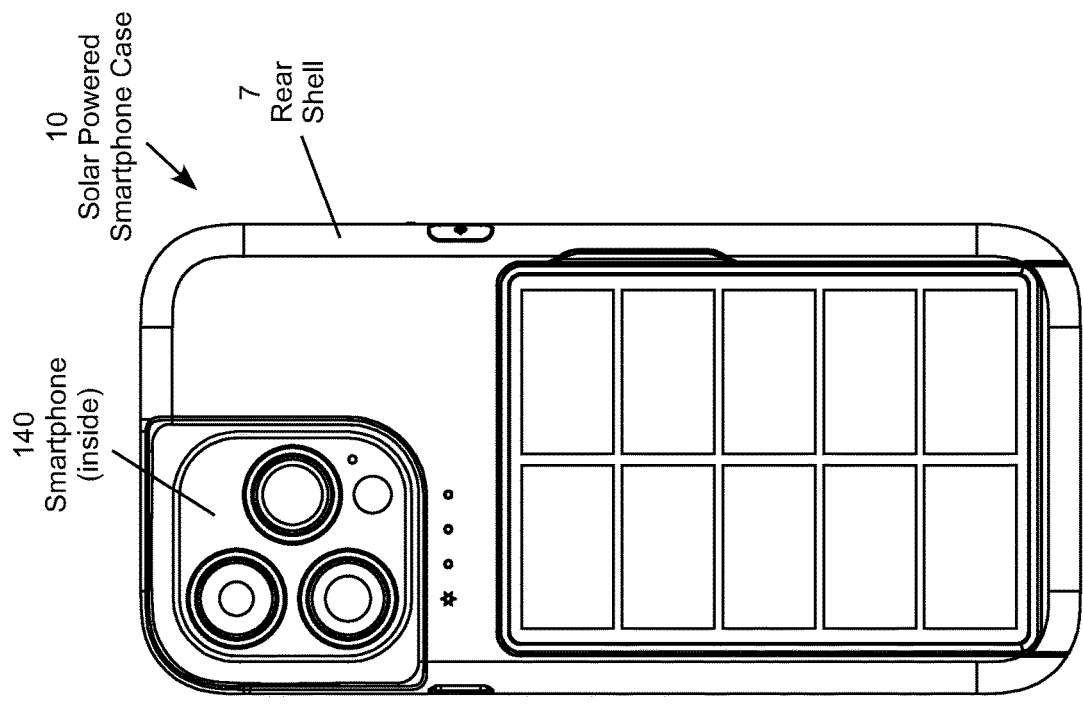
FIG. 15 is a rear view of the solar powered smartphone case enclosing a smartphone.
Figure 14:
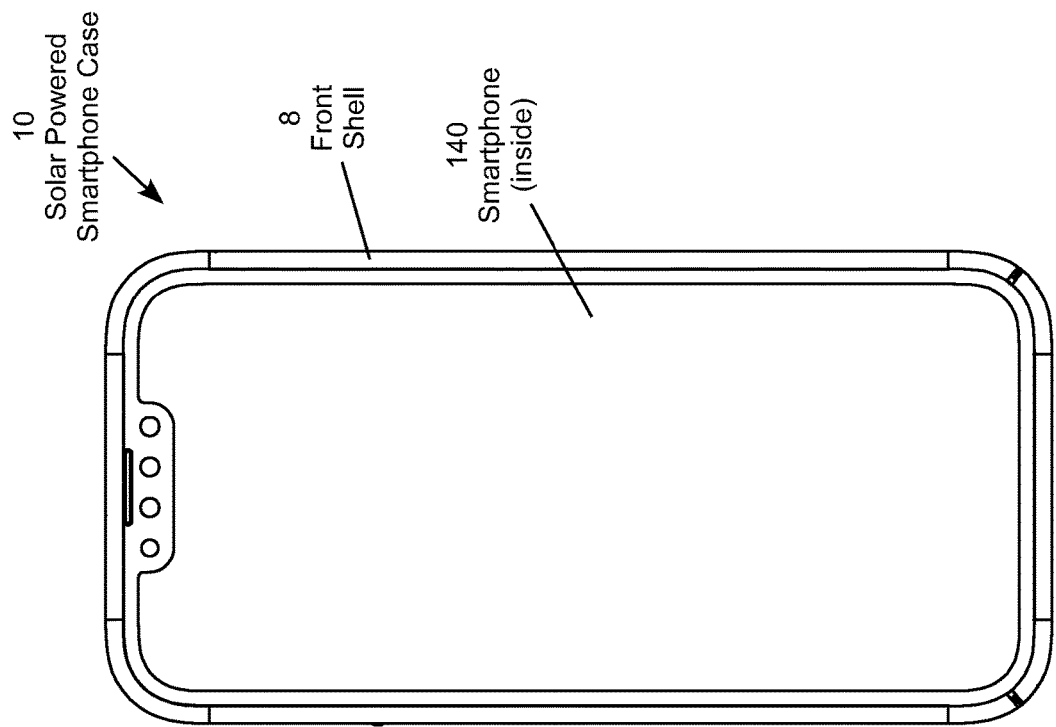
FIG. 14 is a front view of the solar powered smartphone case enclosing a smartphone.
Figure 16B:
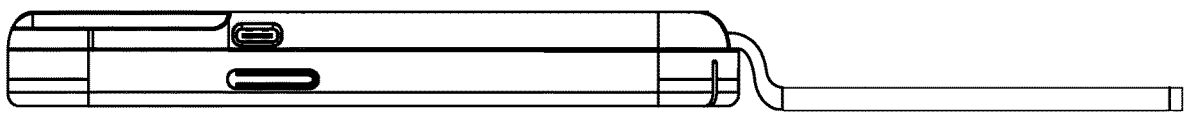
FIG. 16B is a right side view of the solar powered smartphone case with the flip-out door in the extended position.
Figure 16A:
FIG. 16A is a right side view of the solar powered smartphone case with the flip-out door in the folded position.
Figure 17A:
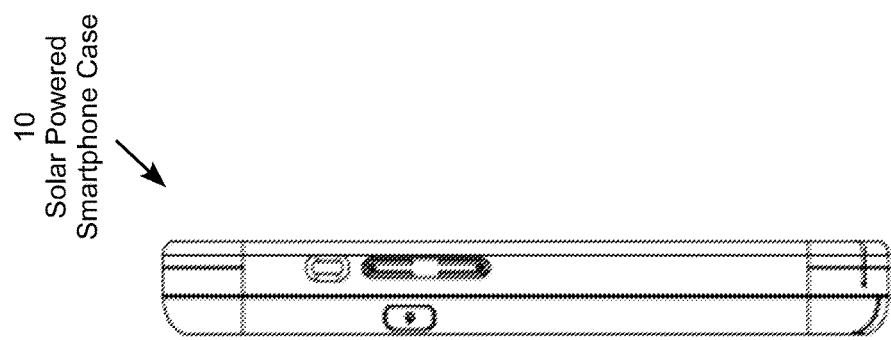
FIG. 17A is a left side view of the solar powered smartphone case with the flip-out door in the folded position.
Figure 17B:
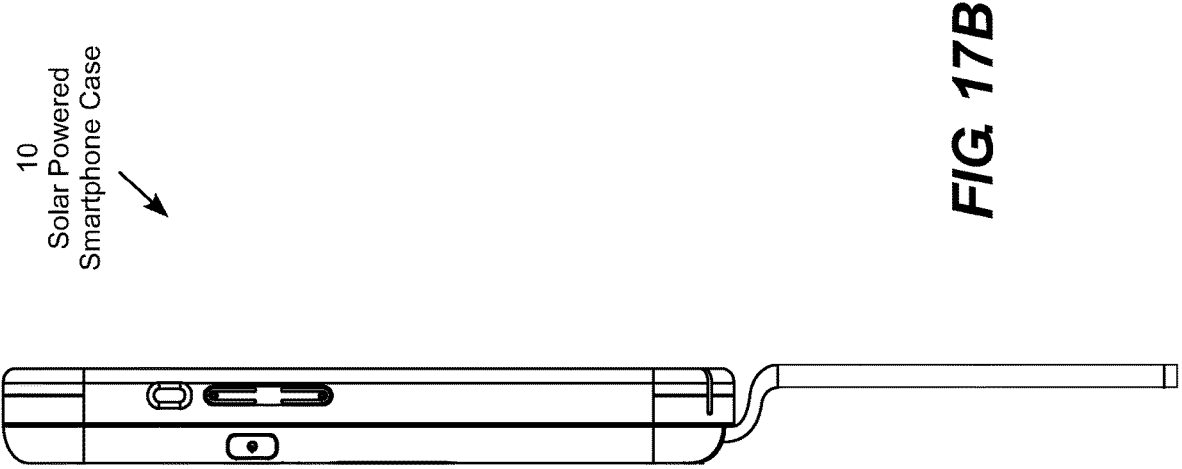
FIG. 17B is a left side view of the solar powered smartphone case with the flip-out door in the extended position.
Figure 20:
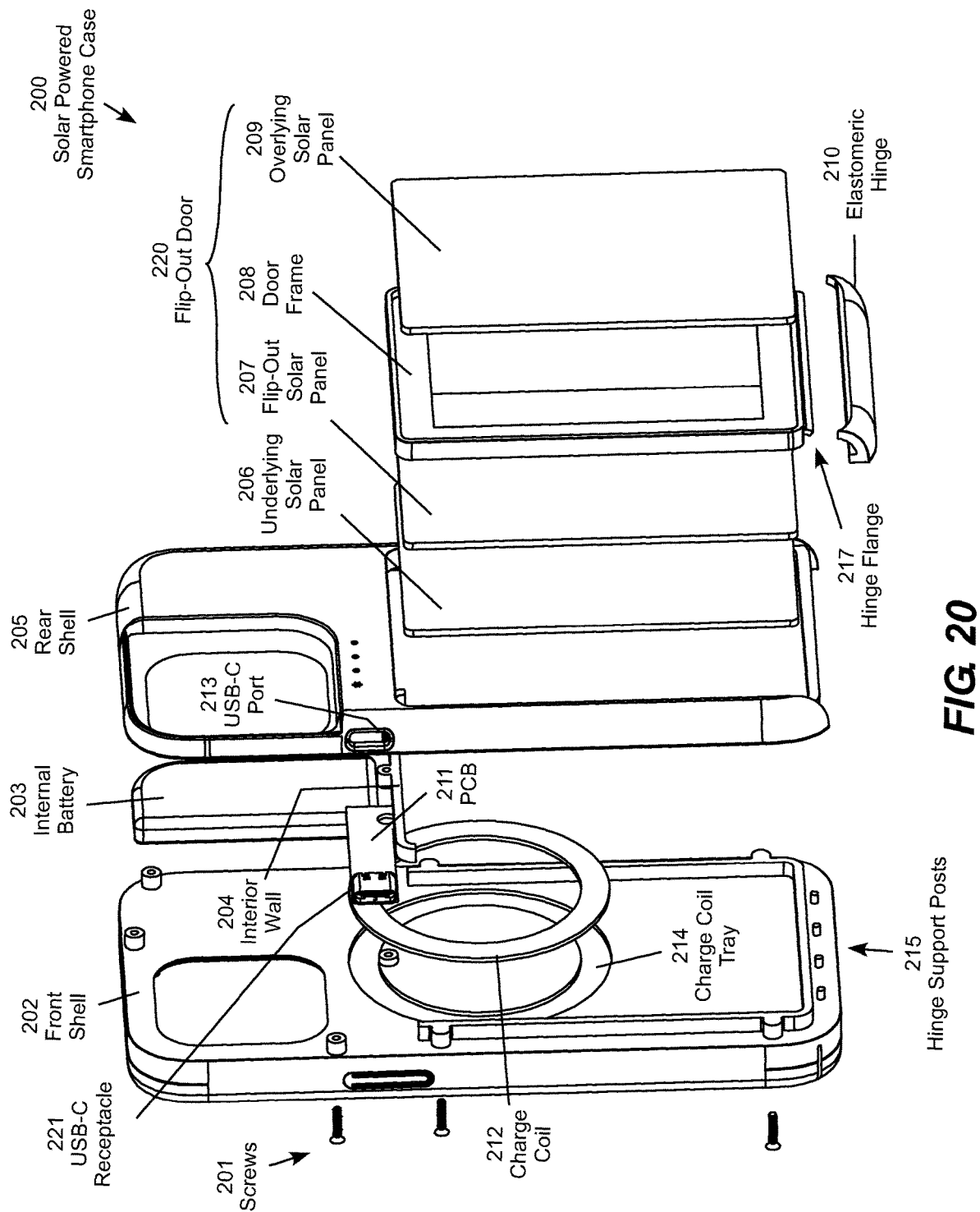
FIGS. 20-23 are exploded views of a first representative embodiment of the solar powered smartphone case.
Figure 21:
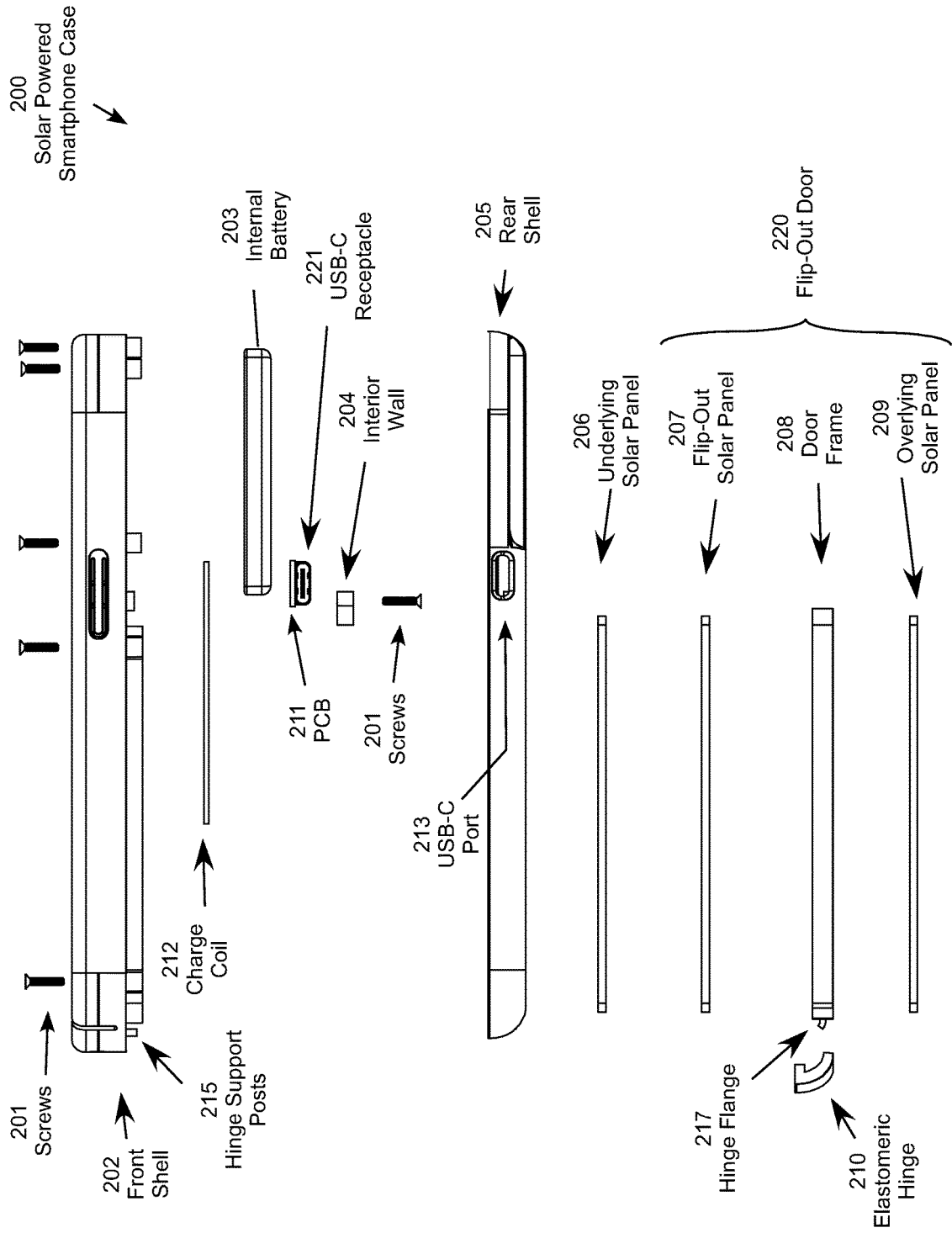
Figure 22:
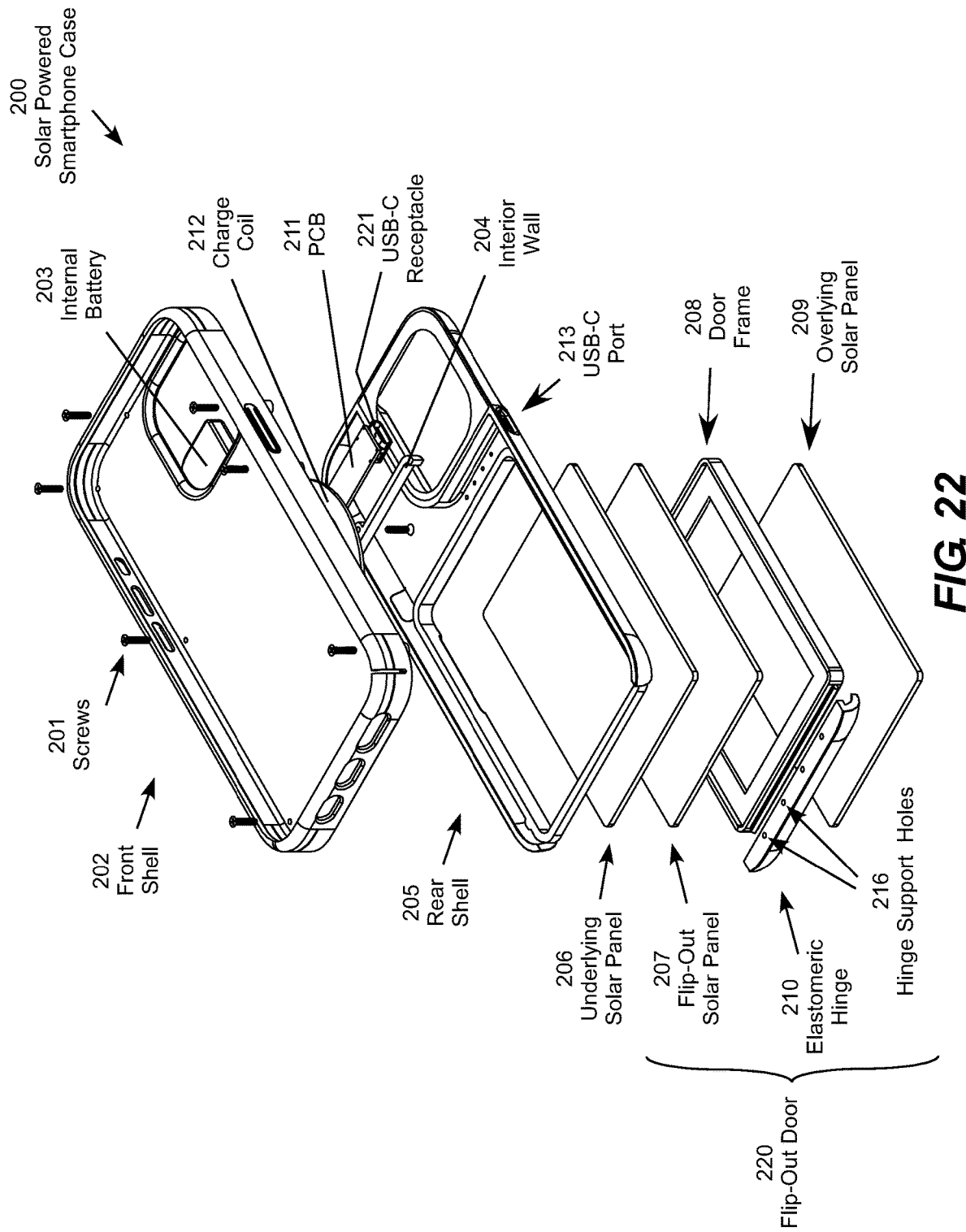
Figure 23:
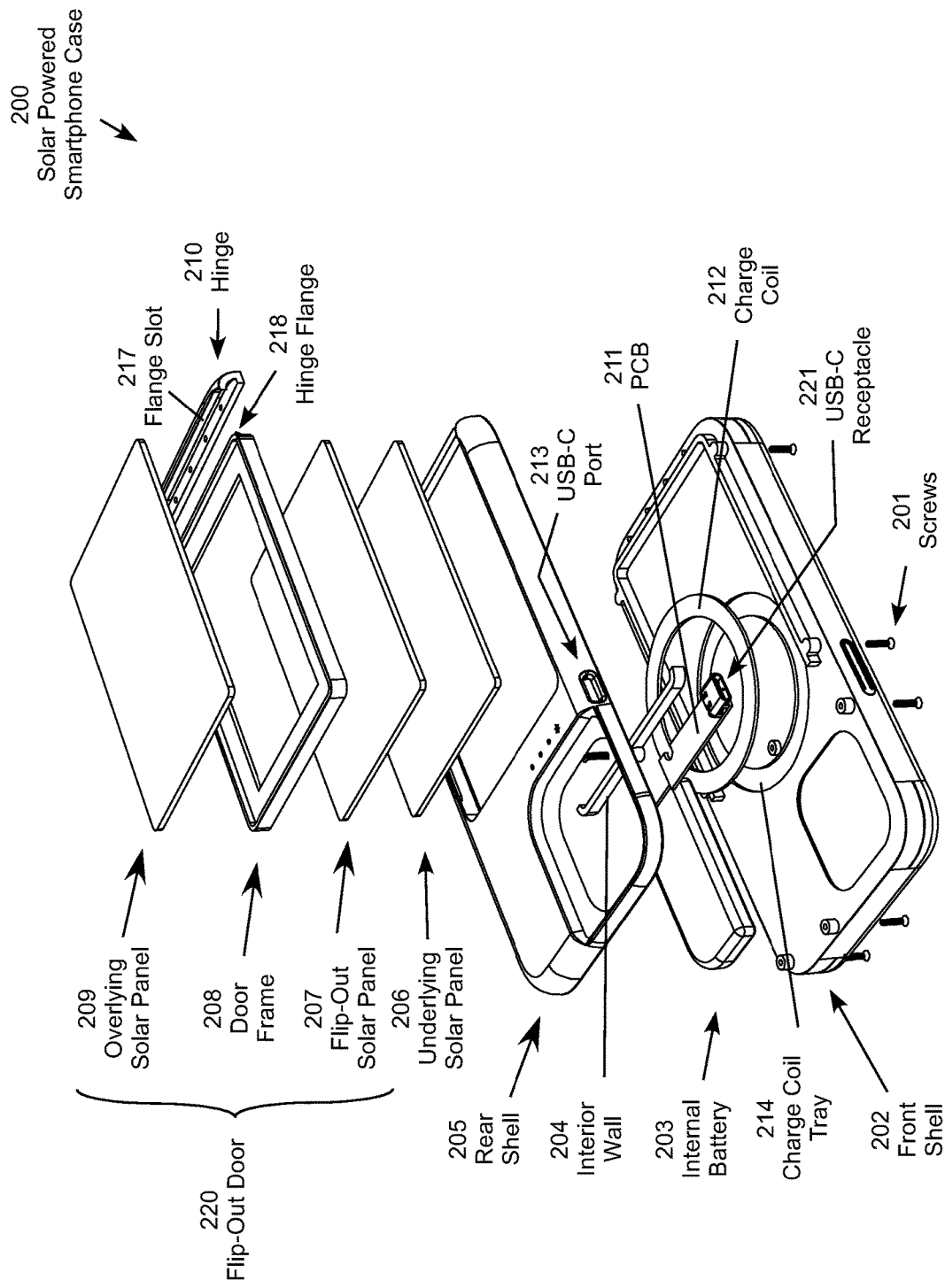

To provide additional views of the illustrative embodiment of the solar powered smartphone case 10, FIG. 12 is a front view and FIG. 13 is a rear view of the solar powered smartphone case without a smartphone held within the case. FIG. 14 is a front view and FIG. 15 is a rear view of the solar powered smartphone case 10 with a smartphone 140 held within the case. In addition, FIG. 16A is a right side view of the solar powered smartphone case 10 with the flip-out door in the folded position, FIG. 16B is a right side view of the solar powered smartphone case with the flip-out door in the extended position, FIG. 17A is a left side view of the solar powered smartphone case with the flip-out door in the folded position, and FIG. 17B is a left side view of the solar powered smartphone case with the flip-out door in the extended position. FIG. 18 is a top side view, and FIG. 19 is a bottom side view of the solar powered smartphone case 10.

FIGS. 20-23 are exploded views of a specific representative embodiment solar powered smartphone case 200, which has a length dimension of about 6 inches (15 cm), is shown approximately to scale for housing an iPhone 13 Pro model. This particular embodiment includes a number of screws holding the case together represented by the specific screws 201 enumerated in the figures. The case 200 includes a front shell 202 with an embossed charge coil tray 214, an internal battery 203, and an interior wall 204 providing a support structure for internal components. The case 200 further includes a rear shell 205, an underlying solar panel 206, a door frame 208, a flip-out solar panel 207, and an overlying solar panel 209. A flip-out door 220 is formed by the door frame 208, which supports the flip-out solar panel 207 and the overlying solar panel 209 back-to-back, and an elastomeric hinge 210 allows the door to articulate between its extended (open) and folded (closed) positions. The underlying solar panel 206 is exposed when the door 220 is in its extended (open) position, while the flip-out solar panel 207 and the overlying solar panel 209 are exposed when the door 220 is in its folded (closed) position.

In this particular embodiment, the elastomeric hinge 210 is attached to the door frame 208 and the front shell 202, which has a series of hinge support posts 215 that receive respective hinge supports holes in the hinge represented by the labeled hinge support holes 216. The elastomeric hinge 210 also included a flange slot 217 that attaches the hinge to an elongated hinge flange 218 along the bottom edge of the door frame 208. On the inside, the case 200 includes a printed circuit board (PCB) 211 carrying electronic components including an electric inverter powering the inductive charge coil 212, which charges a smartphone carried in the case. The charge coil 212 may simultaneously charge the internal battery 203, which may alternatively or alternatively be hardwired to the PCB 211 for charging regardless of whether the internal battery is positioned and provisioned for inductive charging.

Figure 24:
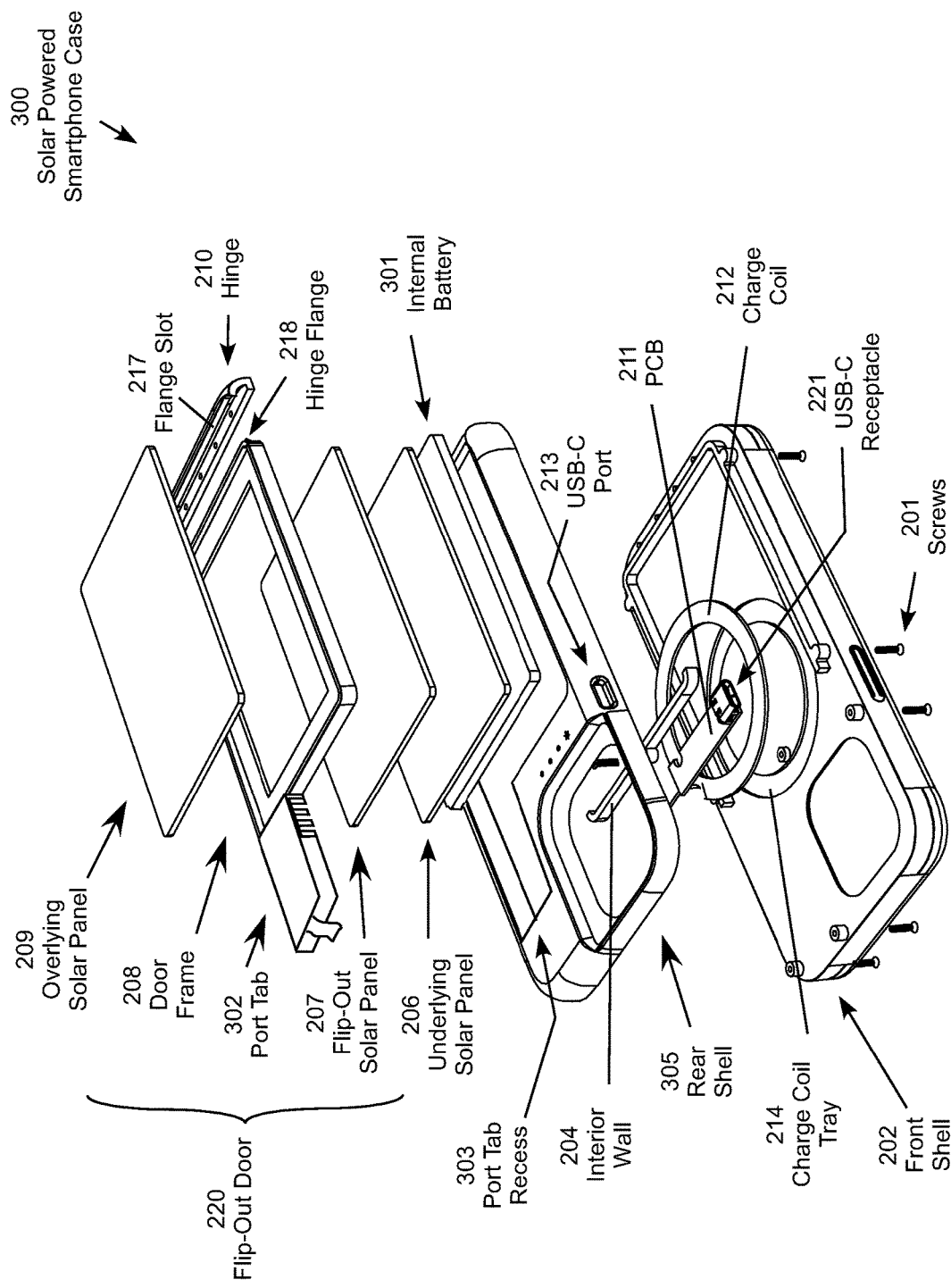
FIG. 24 is an exploded view of a second representative embodiment of the solar powered smartphone case.

FIG. 24 is an exploded view of a second specific embodiment of the solar powered smartphone case 300. This embodiment is similar to the first representative embodiment 200, except that this alternative includes a significantly larger internal battery 301 positioned under the underlying solar panel 206. The embodiment 300 also includes a port tab 302 attached to the door frame 208 and a port tab recess 303 in the rear shell 305 to accommodate the port tab. The rear shell 305 is also a bit deeper than the rear shell 205 by an amount sufficient to house the larger internal battery 301, which is well positioned for inductive charging by the charge coil 212 simultaneously with the smartphone battery inside the smartphone carried within the case 300. Again, the charge coil 212 may simultaneously charge the internal battery 301, which may alternatively or alternatively be hardwired to the PCB 211 for charging regardless of whether the internal battery is positioned and provisioned for inductive charging. In addition, the larger internal battery 301 may be a standard battery of the particular model phone the particular solar smartphone is designed to carry, which, for the iPhone 13 Pro model this illustrated smartphone case 300 is designed to carry, is somewhat smaller than the internal battery 301 shown in FIG. 24.

This embodiment also includes the USB port 213 for charging the internal battery 301 from a power cord plugged into a 120V electric power outlet. Because the internal battery 301 and the smartphone battery inside the smartphone carried within the case 300 are both electrically connected to the charge coil 212 by way of the inverter carried on the PCB 211, the internal battery 301 is capable of charging the smartphone battery when the case 300 is not receiving power from the solar panels or a power cord. Similarly, the case 300 allows the smartphone battery to inductively charge the internal battery 301 when the smartphone battery is charged by a power cord connected to the smartphone, so that both batteries become fully charged when case 300 or the smartphone receives electric power from the solar panels or a power cord. Providing the case 300 and the smartphone with separate power cord connections allows both batteries to be charged faster when they are both connected to charging power through power cords.

Although particular aspects of representative embodiments have been shown and described in detail, it will be apparent to those skills that the invention is not limited to those precise embodiments, and that various modifications and variations can be made to the explicitly described embodiments without departing from the scope or spirit of the invention. The following claims are therefore intended to cover modifications and variations of the representative embodiments provided they come within the scope of the appended claims and their equivalents.

The invention claimed is:

1. A solar powered smartphone case, comprising:
    an enclosure defined by the smartphone case for housing a smartphone within the smartphone case;
    an internal battery;
    an overlying solar panel;
    an underlying solar panel;
    a flip-out solar panel;
    a flip-out door carrying the overlying solar panel and the flip-out solar panel back-to-back pivotable between a folded position and an extended position while the smartphone is housed within the enclosure;
    a hinge pivotably attaching the flip-out door to the enclosure; and
    a battery charger operative for charging the internal battery with electric power generated by the overlying solar panel, the underlying solar panel, and the flip-out solar panel;
    wherein the overlying solar panel is exposed when the flip-out door is in the folded position, the underlying solar panel is concealed when the flip-out door is in the folded position, and the underlying solar panel and the flip-out solar panel are both exposed when the when the flip-out door is in the extended position;
    wherein the enclosure is configured to house the smartphone within the enclosure when the flip-out door is in the folded position and when the flip-out door is in the extended position.

2. The solar powered smartphone case of claim 1, wherein the battery charger comprises an inductive battery charger and the enclosure is configured to house the smartphone with a battery in the smartphone positioned to be charged by the inductive battery charger simultaneously with the internal battery.

3. The solar powered smartphone case of claim 1, wherein the enclosure further comprises a rim creating a snug interference fit releasably folding the flip-out door in the closed position.

4. The solar powered smartphone case of claim 3, wherein the rim defines a pull slot providing access to manually articulate the flip-out door from the folded position to the extended position.

5. The solar powered smartphone case of claim 1, further comprising one or more of:
    an input port for receiving an auxiliary power cord connecting an auxiliary solar panel to the battery charger; and
    an output port for an auxiliary power cord connecting a piggy-back smartphone to be charged by the solar powered smartphone case.

6. The solar powered smartphone case of claim 1, wherein the smartphone case further comprises functional accommodations for operating features of a smartphone housed within the smartphone case.

7. The solar powered smartphone case of claim 1, further comprising:
    an input port for connecting a first auxiliary power cord connecting an auxiliary solar panel to the battery charger; and
    an output port for connecting a second auxiliary power cord connecting a piggy-back smartphone to be charged by the solar powered smartphone case.

8. The solar powered smartphone case of claim 1, wherein the battery charger comprises an inductive battery charger and further comprising a port tab connected to the flip-out door comprising an input port for connecting an auxiliary solar panel to the inductive charger.

9. The solar powered smartphone case of claim 1, further comprising a port tab connected to the flip-out door comprising an output port for connecting a piggy-back smartphone to be charged by the solar powered smartphone case.

10. The solar powered smartphone case of claim 1, further comprising a ribbon pull for manually articulating the flip-out door from the folded position to the extended position.

11. A solar powered smartphone case, comprising:
an enclosure defined by the smartphone case for housing a smartphone within the smartphone case;
an internal battery;
a solar panel;
an inductive battery charger operative for charging the internal battery with electric power generated by the solar panel; and
an input port for connecting a first auxiliary power cord connecting one or more auxiliary solar panels to the inductive battery charger;
wherein the enclosure is configured to house the smartphone with a battery in the smartphone positioned to be charged by the inductive battery charger simultaneously with the internal battery.

12. The solar powered smartphone case of claim 11, further comprising an input current clamp limiting electric current provided by the one or more auxiliary solar panels to the inductive battery charger.

13. The solar powered smartphone case of claim 11, further comprising an output port for connecting a second auxiliary power cord connecting one or more piggy-back smartphones to be charged by the solar powered smartphone case.

14. The solar powered smartphone case of claim 13, further comprising an output current clamp limiting electric current provided to the one or more piggy-back smartphones.

15. The solar powered smartphone case of claim 11, further comprising:
an overlying solar panel;
an underlying solar panel;
a flip-out solar panel;
a flip-out door carrying the overlying solar panel and the flip-out solar panel back-to-back pivotable between a folded position and an extended position while the smartphone is housed within the enclosure; and
a hinge pivotably attaching the flip-out door to the enclosure;
wherein the overlying solar panel is exposed when the flip-out door is in the folded position, the underlying solar panel is concealed when the flip-out door is in the folded position, and the underlying solar panel and the flip-out solar panel are both exposed when the when the flip-out door is in the extended position;
wherein the enclosure is configured to house the smartphone within the enclosure when the flip-out door is in the folded position and when the flip-out door is in the extended position.

16. A solar powered smartphone case, comprising:
an enclosure defined by the smartphone case for housing a smartphone within the smartphone case;
an internal battery;
a solar panel;
an inductive battery charger operative for charging the internal battery with electric power generated by the solar panel; and
an output port for connecting an auxiliary power cord connecting one or more piggy-back smartphones to be charged by the solar powered smartphone case;
wherein the enclosure is configured to house the smartphone with a battery in the smartphone positioned to be charged by the inductive battery charger simultaneously with the internal battery.

17. The solar powered smartphone case of claim 16, further comprising an output current clamp limiting electric current provided to the one or more piggy-back smartphones.

18. The solar powered smartphone case of claim 16, further comprising an input port for connecting a first auxiliary power cord connecting one or more auxiliary solar panels to the inductive battery charger.

19. The solar powered smartphone case of claim 16, further comprising an input current clamp limiting electric current provided by the one or more auxiliary solar panels to the inductive battery charger.

20. The solar powered smartphone case of claim 16, further comprising:
an overlying solar panel;
an underlying solar panel;
a flip-out solar panel;
a flip-out door carrying the overlying solar panel and the flip-out solar panel back-to-back pivotable between a folded position and an extended position; and
a hinge pivotably attaching the flip-out door to the enclosure while the smartphone is housed within the enclosure;
wherein the overlying solar panel is exposed when the flip-out door is in the folded position, the underlying solar panel is concealed when the flip-out door is in the folded position, and the underlying solar panel and the flip-out solar panel are both exposed when the when the flip-out door is in the extended position;
wherein the enclosure is configured to house the smartphone within the enclosure when the flip-out door is in the folded position and when the flip-out door is in the extended position.

* * * * *